US010100981B2

(12) United States Patent
Borghesani et al.

(10) Patent No.: US 10,100,981 B2
(45) Date of Patent: Oct. 16, 2018

(54) APPARATUS AND METHOD FOR FLOW EQUIPARTITION

(71) Applicant: O.M.T. OFFICINA MECCANICA TARTARINI S.r.l., Castel Maggiore (Bologna) (IT)

(72) Inventors: Omero Borghesani, Centro (IT); Stefano Zecchi, Bologna (IT)

(73) Assignee: O.M.T. OFFICINA MECCANICA TARTARINI S.r.l., Castel Maggiore (Bologna) (IT)

( * ) Notice: Subject to any disclaimer, the term of this patent is extended or adjusted under 35 U.S.C. 154(b) by 0 days.

(21) Appl. No.: 15/106,405

(22) PCT Filed: Mar. 17, 2015

(86) PCT No.: PCT/IB2015/051939
§ 371 (c)(1),
(2) Date: Jun. 20, 2016

(87) PCT Pub. No.: WO2015/140706
PCT Pub. Date: Sep. 24, 2015

(65) Prior Publication Data
US 2017/0023184 A1    Jan. 26, 2017

(30) Foreign Application Priority Data

Mar. 18, 2014 (IT) .............................. BO2014A0139

(51) Int. Cl.
*G05D 16/16*      (2006.01)
*F17D 3/01*      (2006.01)
(Continued)

(52) U.S. Cl.
CPC ................. *F17D 3/01* (2013.01); *F17D 1/04* (2013.01); *G05D 16/0602* (2013.01);
(Continued)

(58) Field of Classification Search
CPC ........ Y10T 137/2514; Y10T 137/2521; G05D 16/0605; G05D 16/16; G05D 16/163
See application file for complete search history.

(56) References Cited

U.S. PATENT DOCUMENTS 3,783,894 A * 1/1974 Davison ................ F16K 15/023
                                                      137/533.17
4,752,211 A * 6/1988 Sabin ...................... F23N 1/027
                                                         137/98

(Continued)

FOREIGN PATENT DOCUMENTS

WO    WO-2012/153310 A1    11/2012

OTHER PUBLICATIONS

International Search Report and Written Opinion for Application No. PCT/IB2015/051939, dated Jul. 21, 2015.

*Primary Examiner* — Kevin Murphy
(74) *Attorney, Agent, or Firm* — Marshall, Gerstein & Borun LLP

(57) ABSTRACT

Apparatus for equipartition of the flow between a first line (1) for feeding gas and a second line (2) for feeding gas, in a pressure adjusting system, comprising a first control unit (8) of a first adjusting device (4) for adjusting the pressure of the first line (1) to a first predetermined pressure (P1), a second control unlit (19) of a second adjusting device (6) for adjusting the pressure of the second line (2) to a second predetermined pressure (P2), a pneumatic conduit (19) for connecting between the first control unit (8) and the second adjusting device (6) for adjusting the pressure of the second line (2) to the first predetermined pressure (P1), and a pneumatic switch (20) for interrupting the pneumatic connection for adjusting the pressure of the second line (2) to the second predetermined pressure (P2).

10 Claims, 4 Drawing Sheets

(51) Int. Cl.
 *G05D 16/06* (2006.01)
 *F17D 1/04* (2006.01)
(52) U.S. Cl.
 CPC ......... *G05D 16/0605* (2013.01); *G05D 16/16* (2013.01); *G05D 16/163* (2013.01); *Y10T 137/2514* (2015.04); *Y10T 137/2521* (2015.04)

(56) References Cited

U.S. PATENT DOCUMENTS

| | | | | |
|---|---|---|---|---|
| 4,993,447 | A | * | 2/1991 | Camire .............. G05D 16/0605 137/118.03 |
| 7,201,180 | B2 | * | 4/2007 | Ephrat ................ G05D 16/2086 137/14 |
| 8,496,022 | B2 | * | 7/2013 | Sugiyama ............ G05D 7/0664 137/100 |
| 2002/0170598 | A1 | * | 11/2002 | Girard .................. B60C 23/003 137/226 |

* cited by examiner

APPARATUS AND METHOD FOR FLOW EQUIPARTITION

TECHNICAL FIELD

This invention addresses the technical field relating to the distribution of gas.

More specifically, this invention relates to an equipartition apparatus for systems or stations for adjusting the pressure on two or more lines.

BACKGROUND ART

The systems or stations for adjusting the pressure on several lines are basically plants which allow networks to be fed for carrying and distributing gas to civil and industrial users.

Purely by way of example, systems for adjusting the pressure are used in distribution networks for reducing the gas pressure from medium pressure to low pressure.

With reference to the standards currently in force in Italy, low feed pressure means a pressure between 0.04 bar and 12 bar, medium feed pressure means a pressure between 12 bar and 24 bar, and above this one speaks of high pressure.

The reference to "two or more lines" in the above-mentioned adjusting systems refers to the fact that they usually consist of several pressure adjusting lines arranged in parallel.

Of these lines, one is generally referred to as "main", as it is normally operational, and the others are referred to as "secondary", as they are normally inactive and designed to enter into operation in the case of a fault or malfunction of the main line.

The main and secondary lines are calibrated differently and, if the main line is no longer able to feed gas at the calibration pressure, the secondary lines activate automatically, feeding gas at the relative calibration pressure, which is lower than that of the main line.

Gas distribution firms are starting to make low cost and fully automatic apparatuses for equipartition of the flow that allow the two or more existing lines to be always run in parallel with a flow of gas equipartitioned and substantially equal.

In short, this modification theoretically allows the achievement of many advantages.

A first advantage would be a considerable lowering of the noise level since the flow of gas would be divided between several lines.

Another advantage would be always having in operation the lines, to prevent the problems of sticking of the seals (O-rings) which sometimes occurs when, following a fault on the main line, an emergency line (secondary) must intervene after long periods of inactivity. The problem of sticking of the O-rings is caused by the prolonged inactivity of the apparatuses, a problem which would be resolved by making the lines normally operating.

Another advantage that would be achieved by making several lines operate in parallel would be that of not having to design the lines to operate, for example in the case of two lines, one at 100% and the other at for example 70% but it might, instead, be possible to design both lines to each cover 50% of the total flow. In this way there would be considerable savings also in terms of costs and installation spaces, moreover being able to overcome any faults in the lines by adopting a grid architecture of the current gas distribution networks.

There are prior art devices designed to manage the equipartition of the flow between various lines in parallel but these devices are not free from drawbacks. A first of these drawbacks is due to the fact that they require, so as to be able to control the adjusting devices of the various lines, one or more additional control units, thereby complicating the architecture of the adjusting system and consequently increasing both the plant and management costs.

Another drawback is due to the impossibility of guaranteeing, at least in the case of a fault on the main line, an adequate and safe operation of the remaining parts of the plant.

Another drawback resulting from the introduction of additional control units, in addition to the management complexity, is due to the need to alter the existing service parameters such as, for example, the calibration values of the original control units.

A solution of this type is illustrated in patent document WO2012153310 wherein an additional control line is positioned in parallel with the standard controls combined with each pressure adjusting device.

AIM OF THE INVENTION

The aim of this invention is therefore to provide a technical solution which overcomes these drawbacks, that is to say, to provide an equipartition apparatus which is able to operate effectively and safely in the case of a fault or malfunction on one of the gas feed lines, even without outside energy sources, and which is also inexpensive to make.

Another aim of this invention is to provide a method for equipartition of the gas flow between two feed lines which is practical, simple to manage and efficient.

The above-mentioned aims are achieved according to this invention by an apparatus and method for equipartition of the flow of gas comprising the technical features described in the appended claims.

BRIEF DESCRIPTION OF THE DRAWINGS

The technical characteristics of the invention, with reference to the above aims, are clearly described in the claims below and its advantages are more apparent from the detailed description which follows, with reference to the accompanying drawings which illustrate preferred, non-limiting embodiments, and in which:

DETAILED DESCRIPTION OF PREFERRED EMBODIMENTS OF THE INVENTION

With reference to the accompanying drawings, the numeral 100 denotes in its entirety an apparatus for equipartition of the flow between several gas feed lines.

Figure 1:
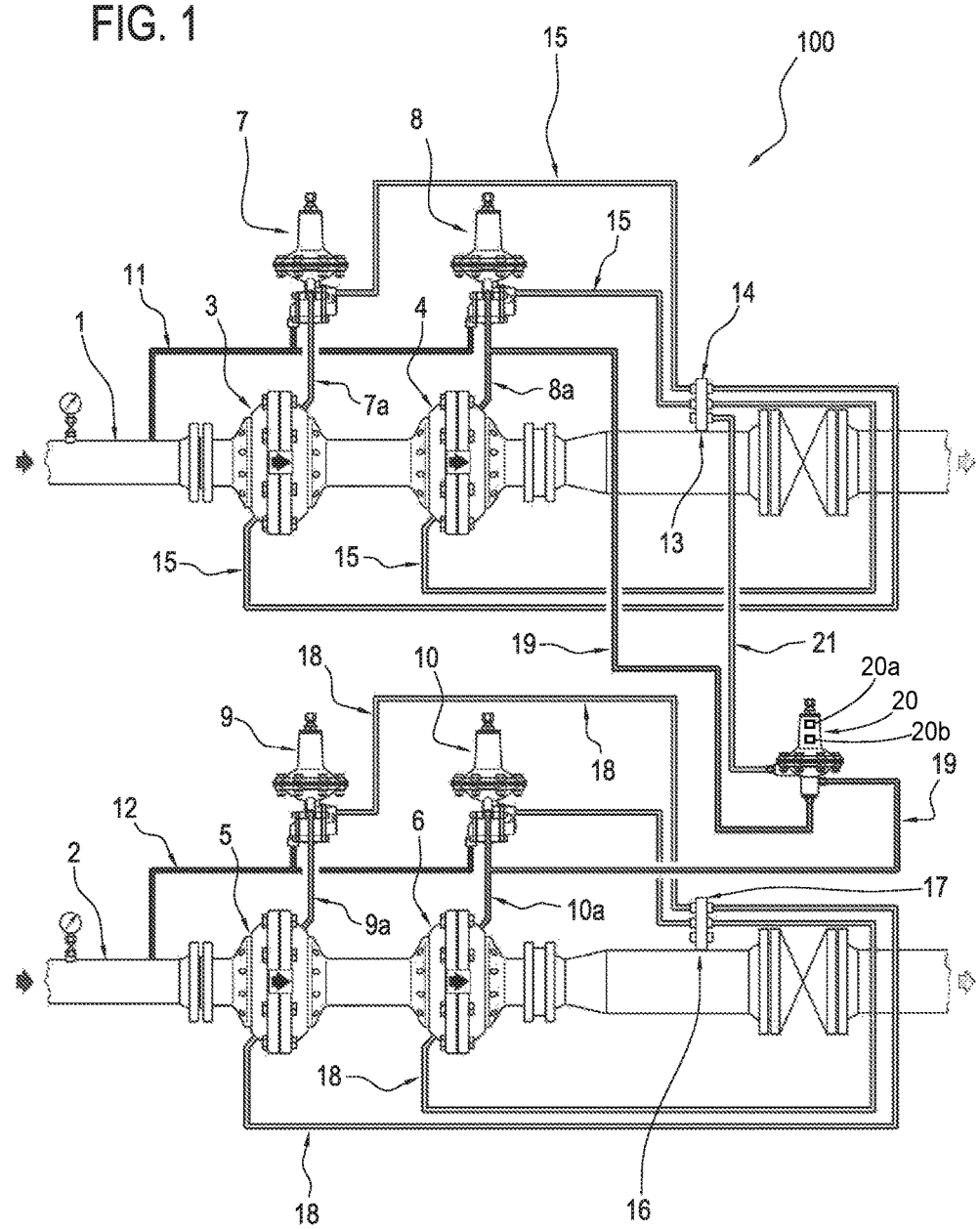
FIG. 1 is a schematic view of a preferred embodiment of the apparatus according to this invention.

With reference to FIG. 1, the numeral 1 denotes a section of a first line for feeding gas hereafter also referred to as the main line.

Numeral 2, on the hand, denotes a section of a second line for feeding gas, parallel to the above-mentioned first line 1, hereinafter also referred to as the secondary line.

Respective arrows indicate the direction of travel of the gas along the lines 1,2.

With reference to the first line 1, along the section illustrated there are, one after the other, two devices 3, 4, of substantially known type, for adjusting the pressure.

The adjusting device 3 positioned upstream relative to the above-mentioned direction of travel is a reserve device whilst the adjusting device 4 positioned downstream is the one normally operating, which therefore adjusts the pressure of the gas passing through it. The adjusting device 4 positioned downstream will be referred to hereinafter also as the first adjusting device.

Similarly to what was just described, considering the second line 2, along the section illustrated there are, one after the other, two respective devices 5, 6, for adjusting the pressure, also of substantially known type.

The adjusting device 5 positioned upstream, relative to the above-mentioned direction of travel, is a reserve device whilst the adjusting device 6 positioned downstream is the one normally operating, which therefore adjusts the pressure of the gas passing through it. The adjusting device 6 positioned downstream will be referred to hereinafter also as the second adjusting device.

The above-mentioned pressure adjusting devices 3, 4, 5, 6 contribute to defining, on the lines 1, 2, a pressure adjusting system.

Purely by way of an example, assuming to be at a so-called final adjusting system, which receives the gas from pipes at a low-pressure for distribution to networks for feeding users, it can be considered that, upstream of the adjusting devices 3, 5, the gas pressure is approximately 5 bar whilst downstream of the first and second adjusting device 4, 6 it is in the order of 20 mbar.

These values are given purely by way of an example and do not limit the scope of the invention.

For each of the pressure adjusting devices 3, 4, 5, 6, the apparatus according to this invention comprises a respective control unit 7, 8, 9, 10.

The control units 7, 8, 9, 10 are of substantially known type and are actuated pneumatically using the difference in pressure of the gas between upstream and downstream of the pressure adjusting devices 3, 4, 5,6.

Each control unit 7, 8, 9, 10 is connected to the respective adjusting device 3, 4, 5, 6 by a respective drive conduit 7a, 8a, 9a, 10a.

In the following description, the control units 8, 10 of the first and second pressure adjusting device 4, 6 will also be indicated, respectively, as the first control unit 8 and the second control unit 10.

The apparatus 100 for equipartition of the flow between several gas supply lines comprises a number of control units 7, 8, 9, 10 equal to the number of pressure adjusting devices 3, 4, 5, 6 present on the lines 1 and 2.

In other words, this means that the apparatus 100 does not comprise any auxiliary control unit other than those relative to each pressure adjusting device 3, 4, 5, 6.

Basically, all the safety regulations regarding gas distribution require that each pressure adjusting device be associated with a relative control unit and this assembly is also normally subjected to testing.

Each feed line 1, 2 also comprises a respective actuating conduit 11, 12 for driving the control units 7, 8, 9, 10.

On the first line 1, downstream of the first adjusting device 4, there is a pressure pick-up point 13.

From this point, 13, advantageously integrating a manifold 14, a plurality of pipes 15 extend, designed to transmit the measured pressure value (normally P1) to the various devices forming part of the adjusting system on the line 1.

Similarly to that just described with reference to the first line 1, also on the second line 2, downstream of the second adjusting device 6 there is a pressure pick-up point 16.

From this point 16, advantageously integrating a manifold 17, a plurality of pipes 18 extend, designed to transmit the measured pressure value to the various devices forming part of the adjusting system on the line 2.

In particular, both the pressure adjusting devices 3, 4, 5, 6 and the relative control units 7, 8, 9, 10 need, in known manner, for the correct operation, to receive a signal representing the pressure value downstream of the first and second adjusting device 4, 6.

A way to transmit this value is that of placing directly in communication each of the above-mentioned adjusting devices and control units with the gas on the respective line, downstream of the adjusting device 4, 6.

As illustrated in FIG. 1, the equipartition apparatus 100 comprises a pneumatic conduit 19 for connecting the first control unit 8 of the first adjusting device 4 with the second adjusting device 6, to determine in the second line 2, downstream of the second adjusting device 6, a pressure P1 equal to that adjusted on the first line 1.

In practice, the pneumatic conduit 19 connects the conduit 8a with the conduit 10a, effectively excluding the control unit 10 from the control of the second adjusting device 6, thanks to the calibration pressure P2 of the unit 10 which is less than the calibration pressure P1 of the unit 8.

In other words, by means of the pneumatic connection conduit 19 the control unit 8 of the first adjusting device 4 also controls the second adjusting device 6, effectively equipartitioning the pressure of the gas passing along the two lines 1, 2 downstream of the apparatus 100.

As illustrated in FIG. 1, the equipartition apparatus 100 comprises an automatic pneumatic switch 20 positioned along the pneumatic connection conduit 19.

The pneumatic switch 20 is designed to interrupt the pneumatic connection between the first control unit 8 and the second device 6 for adjusting the pressure of the second line 2.

As illustrated in FIG. 1, the apparatus 100 comprises a pneumatic conduit 21 for feeding the switch 20. The switch 20 is therefore a pneumatically operated pneumatic switch.

The pneumatic feeding conduit 21 is connected to the first gas feed line 1, downstream of the first adjusting device 4, in a zone subjected normally to the above-mentioned first predetermined pressure P1.

Advantageously, the pneumatic conduit 21 is connected to the manifold 14 defining the above-mentioned pick-up point 13.

Advantageously, the pneumatic switch 20 comprises, a membrane 20a and a spring 20b opposing the force generated by the action of the gas pressure acting on the membrane 20a.

The above-mentioned pneumatic feeding conduit 21 defines for the apparatus 100 means of a pneumatic type for controlling the pneumatic switch 20.

Figure 2:
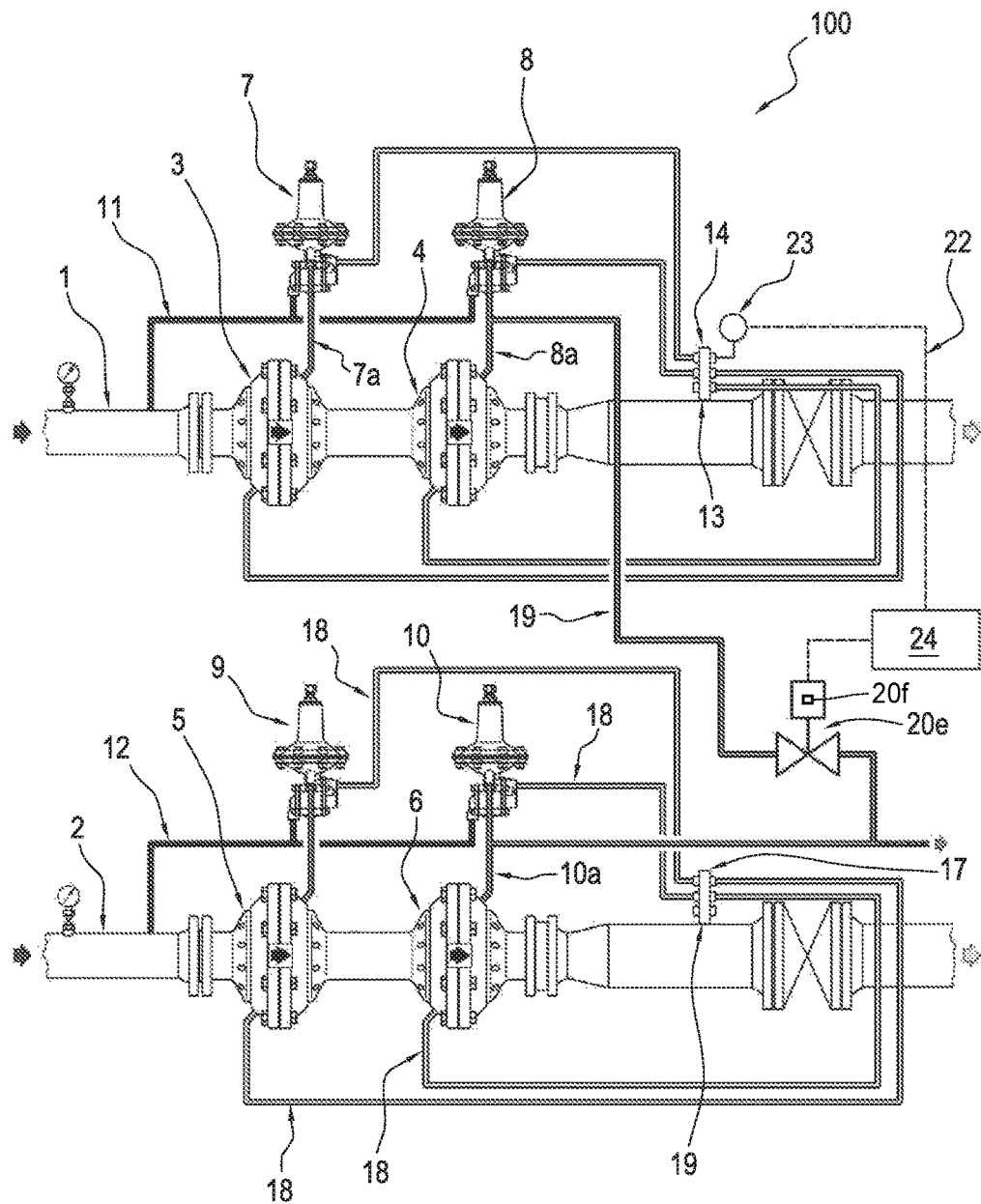
FIG. 2 is a schematic view of a variant embodiment of the apparatus of FIG. 1.

In the variant embodiment illustrated in FIG. 2, the equipartition apparatus 100 comprises, as an alternative to the switch 20 described above, a pneumatic switch 20e actuated electrically, inside an electrical circuit 22.

The electrical circuit 22 comprises a pressure sensor 23 positioned along the main line 1 for measuring the pressure value existing on the main line 1 downstream of the first adjusting device 4, a value which is normally that of the pressure P1 determined by the first control unit 8.

The pressure sensor 23 transforms the measured pressure value into an electrical signal which through the circuit 22 reaches a control unit 24 that operates the pneumatic switch 20e actuated electrically. More precisely, according to a preferred embodiment, the control unit 24 controls an electric actuator 20f contained inside the switch 20e and opposed by a spring which, in the absence of the action of the actuator 20f, would tend to close the switch 20e, that is, interrupt the connecting conduit 19.

This circumstance is equivalent, as described above, to interrupting the pneumatic connection between the first control unit 8 and the second device 6 for adjusting the pressure of the second line 2.

The above-mentioned pressure sensor 23, electrical connecting circuit 22 and control unit 24 define, in their entirety, electrical means of controlling the pneumatic switch 20e.

Figure 3:
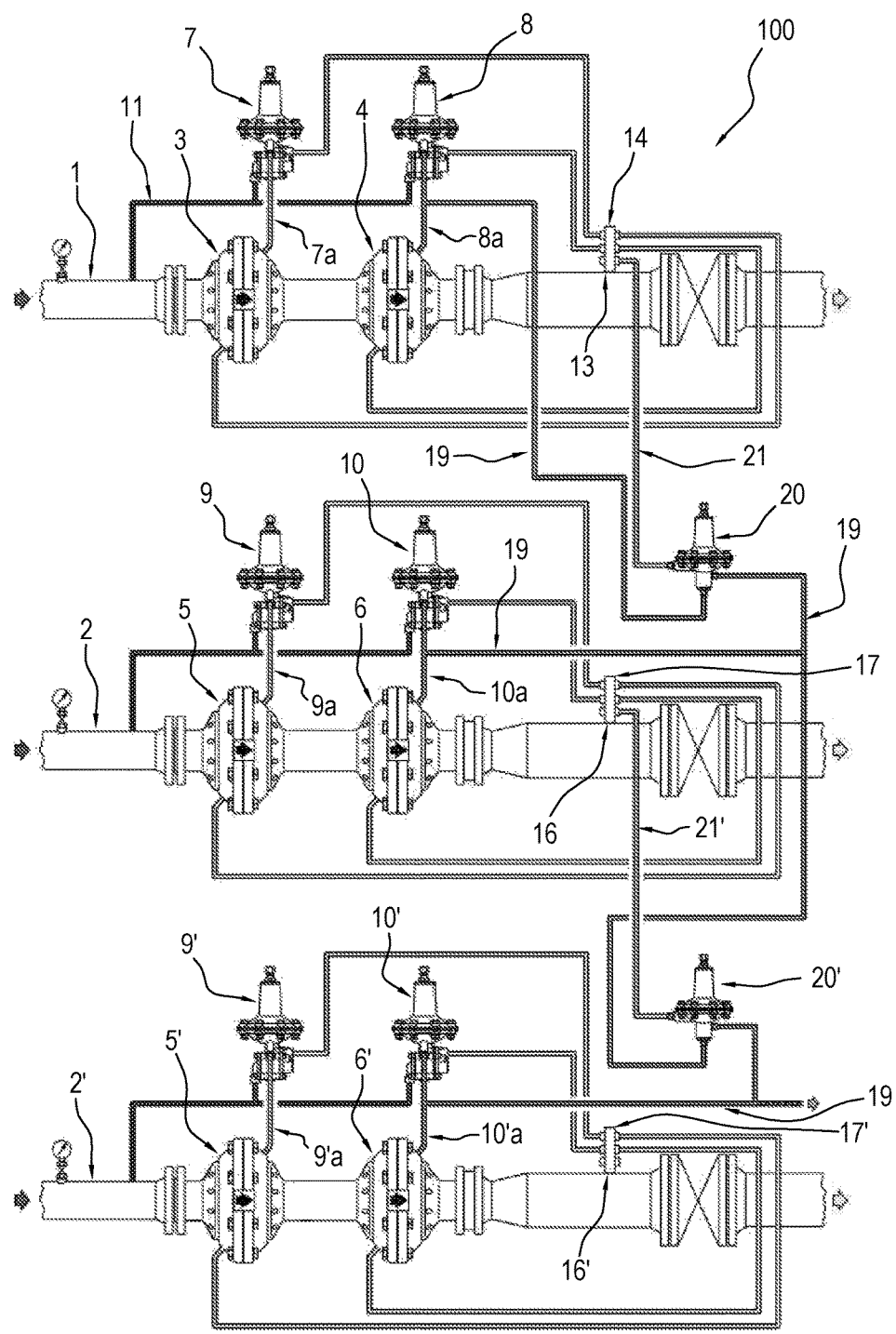
FIG. 3 is a schematic view of a further variant embodiment of the apparatus of FIG. 1.

In the variant embodiment illustrated in FIG. 3, the equipartition apparatus 100 operates on three lines 1, 2, 2' for feeding the gas.

With regard to the component elements of the lines 1 and 2, reference should be made to the above description regarding FIG. 1.

The line 2' is also a secondary line like the 'line 2 described above. The component elements of the line 2' corresponding and equivalent to elements already indicated with reference to the line 2, are denoted with the same numerical reference differentiated solely by an apex as in the case of 2 and 2' just indicated above.

In the apparatus 100 illustrated in FIG. 3, the conduit 19 connects the control unit 8 of the first adjusting device 4 with the second adjusting device 6 and also with a third adjusting device 6' of the third line 2', to determine, both in the second line 2, downstream of the second adjusting device 6, and in the third line 2', downstream of the third adjusting device 6', a same pressure P1 equal to that adjusted on the first line 1.

In this case, the pneumatic conduit 19 connects the conduit 8a both with the conduit 10a and with the conduit 10'a, effectively excluding both the control unit 10 from the control of the second adjusting device 6, and the control unit 10' from the control of the third adjusting device 6', thanks to the fact that both the calibration pressure P2 of the unit 10 and the calibration pressure P3 of the unit 10' are less than the calibration pressure P1 of the unit 8.

In other words, by means of the pneumatic connection conduit 19 the control unit 8 of the first adjusting device 4 also controls the further adjusting devices 6, 6', effectively equipartitioning the pressure of the gas passing along all the lines 1, 2, 2' downstream of the apparatus 100.

In use, with reference to the diagram shown in FIG. 1, during normal operation, the first control unit 8 of the first device 4 for adjusting the pressure of the main line 1 also controls the second device 6 for adjusting the pressure of the secondary line 2. In this way, both the lines 1, 2 feed gas downstream at the same calibration pressure P1 as the first control unit 8.

This, as mentioned, occurs under normal operation of the equipartition apparatus 100, where, precisely, the flow of gas is equally distributed between the main line 1 and the secondary line 2.

The automatic pneumatic switch 20, calibrated at a pressure Pv slightly less than P1, is therefore normally active, that is to say, open, allowing the pneumatic connection between the first control unit 8 and the second device 6 for adjusting the pressure of the secondary line 2, through the connecting conduit 19.

In this normal operating condition, the second control unit 10 associated with the second device 6 for adjusting the pressure of the second line 2 is inactive (but designed to determine, when active, downstream of the second adjusting device 6, a second pressure P2 less than both the pressure P1 and the calibration pressure Pv of the pneumatic switch).

If there is a fault or a malfunction on the main line, such as to determine downstream of the adjusting device a lowering of the pressure to a value P0 which is also considerably less than the calibration value P1 of the first control unit 8, the pressure P0 is established immediately also within the pneumatic switch 20.

In short, the above-mentioned lowering of pressure along the main line 1 can result from a drawing of gas by users downstream, which is not supported by a suitable feed flow; this circumstance usually occurring due to a blockage caused by a fault.

Since the pneumatic switch 20 is calibrated at a pressure Pv just less than the value P1, it deactivates immediately (when it reaches the pressure P0 significantly less than P1), thus interrupting the pneumatic conduit 19 for connecting between the first control unit 8 and the second device 6 for adjusting the pressure of the secondary line 2.

Following this interruption, the second control unit 10 becomes active on the second pressure adjusting device 6, imposing on the adjusting device 6 a relative calibration pressure P2, less than both P1 and Pv.

In this way, following the modified command on the second adjusting device 6, the new pressure P2, which is less than the pressure P1 existing on both the lines 1, 2 for feeding the gas when both were operating, is created on the second line 2.

The operation of the apparatuses 100 illustrated in FIGS. 2 and 3 is not unlike that just described with reference to FIG. 1.

With regard to the embodiment shown in FIG. 2, the pneumatic switch 20e actuated electrically is activated by the respective control unit 24 as a function of the pressure value measured by the pressure sensor 23.

However, in the embodiment of FIG. 3 there are two pneumatic switches 20, 20', each acting on the connecting conduit 19 and controlled by the pressure measured respectively at the pick-up points 13 and 16.

The switch 20 is designed to interrupt the connecting conduit 19 in the case of lowering of the pressure on the line 1, while the switch 20' is designed to interrupt the connecting conduit 19 in the case of lowering of the pressure on the line 2.

Similarly to what is described above regarding calibration of the pneumatic switch 20 at a pressure Pv slightly less than the value P1, in the case of the pneumatic switch 20', it is calibrated at a pressure P'v slightly less than the value P2 and in any case greater than P3.

In this way, following a fault on the line 1, the calibration pressure P2 of the second control unit 10 is established on the line 2 and the same occurs on the third line 2', operating the second control unit 10, through the lower section of the conduit 19, also on the third adjusting device 6'.

When, the other hand, a fault also occurs on the second line 2, the switch 20' will interrupt the conduit 19 and the second adjusting device 6' will be adjusted by the respective control unit 10' that will impose the relative calibration pressure P3 on the third line 2'.

Figure 4:
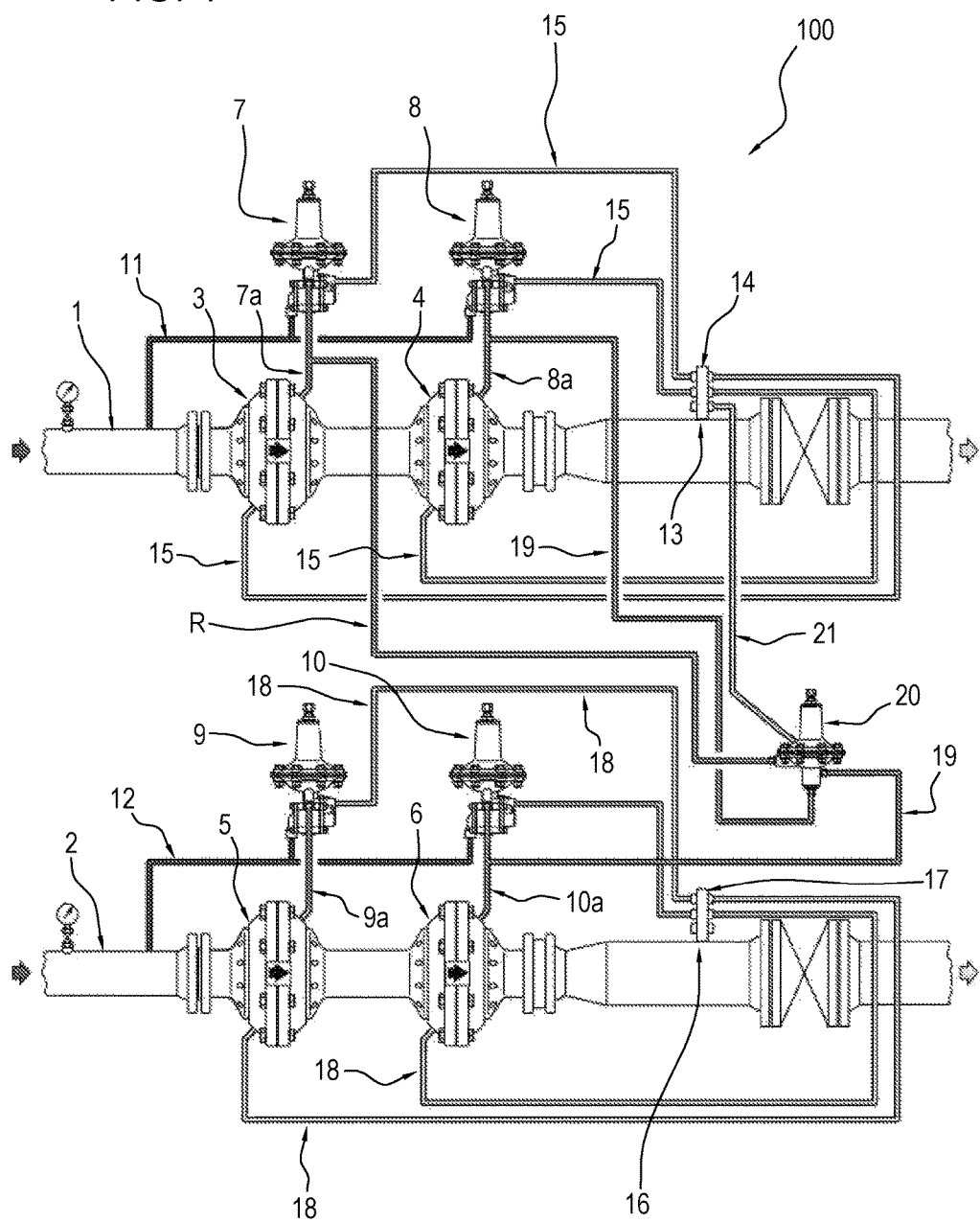
FIG. 4 is a schematic view of a further variant embodiment of the apparatus of FIG. 1.

In the variant embodiment illustrated in FIG. 4, the equipartition apparatus 100 comprises a pneumatic conduit R for connecting the pneumatic switch 20 to the conduit 7a for driving the standby pressure adjusting device 3 of the main line, the conduit being interposed between the control unit 7 and the standby pressure adjusting device 3.

The pneumatic switch 20 is therefore driven by the pressure existing in the conduit 7a for driving the standby pressure adjusting device 3.

According to the embodiments illustrated in FIGS. 1 to 3, the pneumatic switch 20, driven by the pressure existing in the manifold 14, interrupts the pneumatic conduit 19 for connecting between the first control unit 8 and the second pressure adjusting device 6 following a complete malfunction on the main line, this malfunction consisting basically in a block (closure) of the line itself.

In the variant embodiment of FIG. 4, on the other hand, the pneumatic switch 20 interrupts the pneumatic conduit 19 when the standby pressure adjusting device 3 intervenes.

In other words, the pneumatic switch 20 intervenes following a malfunction of the device 4 of the main line 1 such as to cause the intervention of the standby pressure adjusting device 3 of the main line 1, but not necessarily the block of the dispensing of gas of that line 1.

By actuating the above-mentioned operation, the equipartition apparatus 100 according to this invention, in its many alternative embodiments, brings important advantages.

A first of these advantages is due to the fact that the devices 4, 6, 6' for adjusting the various lines do not require, for their control, control units in addition to those already usually provided on each feed line.

Another advantage is the possibility, in the event of a fault on the main line 1, of guaranteeing an adequate and safe operation of the remaining lines 2, 2' even though at slightly reduced pressures.

Another advantage achieved by the apparatus 100 for equipartition of the pressure according to this invention is the fact that the original service parameters of the individual lines can be maintained, such as, for example, the calibration pressure values P1, P2, P3 of the original control units already present on the lines 1, 2, 2' regardless of their operation in equipartition mode.

Another advantage, specifically for the embodiments illustrated in FIGS. 1 and 3, that is to say, having pneumatically operated pneumatic switches 20, 20, is that of not requiring, for their operation, any energy supply other than the energy of the gas pressure carried by the lines 1, 2, 2'.

In other words, unlike equipartition apparatuses of known type, the apparatus according to this invention in its embodiments which adopt a pneumatically operated pneumatic switch 20, 21, does not need for its correct operation any source of external energy (for example to supply a solenoid valve).

The invention described above is susceptible of industrial application and may be modified and adapted in several ways (such as, for example, in the equipartition of the flow between high pressure lines) without thereby departing from the scope of the inventive concept. Moreover, all the details of the invention may be substituted by technically equivalent elements.

The invention claimed is:

1. An apparatus for equipartition of flow between a first line for feeding gas and a second line for feeding gas, comprising:
   at least a first and a second pressure adjusting device positioned, respectively, along the first and second lines, the first and second pressure adjusting devices being associated with a single respective first and second control units, wherein the first control unit is calibrated for determining, downstream of the first pressure adjusting device, along the first line, a first predetermined pressure, and the second control unit of the second pressure adjusting device is designed to determine, when operating, downstream of the second pressure adjusting device, along the second line, a second predetermined pressure, the second pressure being less than the first pressure;
   a pneumatic connection conduit for connecting between the first control unit and the second pressure adjusting device for adjusting the pressure of the second line to determine in the second line, downstream of the second pressure adjusting device, a pressure equal to the first pressure, and
   a pneumatic switch positioned along the pneumatic connection conduit and designed to interrupt the pneumatic connection between the first control unit and the second pressure adjusting device for adjusting the pressure of the second line;
   wherein the total number of control units consists of a number that is equal to the total number of pressure adjusting devices.

2. The apparatus for equipartition according to claim 1, wherein the pneumatic switch is calibrated to remain normally open for pressure values in the first line, downstream of the first pressure adjusting device for adjusting the pressure, greater than or equal to a pressure between the first and second predetermined pressures.

3. The apparatus for equipartition according to claim 1, further comprising a controller for controlling the pneumatic switch, the controller operating on the pneumatic switch for activating the closing of the pneumatic switch which determines the interruption of the pneumatic connection conduit.

4. The apparatus for equipartition according to claim 3, wherein the controller is of the pneumatic type and comprises a pneumatic feeding conduit for feeding the pneumatic switch, the pneumatic feeding conduit being connected to the first line for feeding gas, downstream of the first pressure adjusting device, subjected normally to the first predetermined pressure.

5. The apparatus for equipartition according to claim 4, wherein the pneumatic switch comprises a membrane and a spring opposing the force generated by the action of the gas pressure acting on the membrane.

6. An apparatus for equipartition according to claim 3, wherein the controller is of the electrical type and comprises a pressure sensor positioned along the first line for feeding gas, downstream of the pressure adjusting device, subjected normally to the first predetermined pressure, an electric actuator positioned inside the pneumatic switch, and an electrical circuit connecting the sensor and the electric actuator, the circuit comprising a control unit to activate the electric actuator and close the pneumatic switch when the sensor detects on the main line a pressure value less than the predetermined pressure.

7. A method for equipartition of flow of gas between a first feeding line having a first pressure adjusting device and a second feeding line having a second pressure adjusting device in a pressure adjusting system, the first and second pressure adjusting devices for adjusting the pressure, comprising:
   preparing a single control unit for each pressure adjusting device, in such a way that the total number of control units consists of a number that is equal to the total number of pressure adjusting;
   adjusting the pressure of the first feeding line to a first predetermined pressure using the first pressure adjusting device for adjusting the pressure controlled by a first control unit;

preparing a pneumatic conduit for connecting between the first control unit and the second pressure adjusting device for adjusting the pressure of the second line;

adjusting the pressure of the second line to the first predetermined pressure, using the second pressure adjusting device for adjusting the pressure controlled by the first control unit; and preparing a pneumatic switch along the pneumatic conduit designed to interrupt the connection between the first control unit and the second pressure adjusting device for adjusting the pressure of the second line under predetermined conditions.

8. A method for equipartition according to claim 7, further comprising actuating the pneumatic switch to interrupt the connection between the first control unit and the second pressure adjusting device for adjusting the pressure of the second line, the step of actuating the pneumatic switch being activated at a lowering of the pressure in the first line to a value less than the first predetermined pressure.

9. An apparatus for equipartition of flow between a first line for feeding gas and a second line for feeding gas, comprising:

at least a first and a second pressure adjusting device positioned, respectively, along the first and second lines, the first and second pressure adjusting devices being associated with respective first and second control units, wherein the first control unit is calibrated for determining, downstream of the first pressure adjusting device, along the first line, a first predetermined pressure, and the second control unit of the second pressure adjusting device is designed to determine, when operating, downstream of the second pressure adjusting device, along the second line, a second predetermined pressure, the second pressure being less than the first pressure;

a pneumatic connection conduit for connecting between the first control unit and the second pressure adjusting device for adjusting the pressure of the second line to determine in the second line, downstream of the second pressure adjusting device, a pressure equal to the first pressure, a pneumatic switch positioned along the pneumatic connection conduit and designed to interrupt the pneumatic connection between the first control unit and the second pressure adjusting device for adjusting the pressure of the second line; and a controller for controlling the pneumatic switch, the controller operating on the pneumatic switch for activating the closing of the pneumatic switch which determines the interruption of the pneumatic connection conduit, wherein the controller is of the electrical type and comprises a pressure sensor positioned along the first line for feeding gas, downstream of the pressure adjusting device, subjected normally to the first predetermined pressure, an electric actuator positioned inside the pneumatic switch, and an electrical circuit connecting the sensor and the electric actuator, the circuit comprising a control unit to activate the electric actuator and close the pneumatic switch when the sensor detects on the main line a pressure value less than the predetermined pressure.

10. A method for equipartition of flow of gas between a first feeding line having a first pressure adjusting device and a second feeding line having a second pressure adjusting device in a pressure adjusting system the first and second pressure adjusting devices for adjusting the pressure, comprising:

preparing a control unit for each pressure adjusting device, in such a way that the total number of control units equals the total number of pressure adjusting devices;

adjusting the pressure of the first feeding line to a first predetermined pressure using the first pressure adjusting device for adjusting the pressure controlled by a first control unit;

preparing a pneumatic conduit for connecting between the first control unit and the second pressure adjusting device for adjusting the pressure of the second line;

adjusting the pressure of the second line to the first predetermined pressure, using the second pressure adjusting device for adjusting the pressure controlled by the first control unit;

preparing a pneumatic switch along the pneumatic conduit designed to interrupt the connection between the first control unit and the second pressure adjusting device for adjusting the pressure of the second line under predetermined conditions; and actuating the pneumatic switch to interrupt the connection between the first control unit and the second pressure adjusting device for adjusting the pressure of the second line, the step of actuating the pneumatic switch being activated at a lowering of the pressure in the first line to a value less than the first predetermined pressure.

* * * * *